(12) United States Patent
Park et al.

(10) Patent No.: US 9,271,621 B2
(45) Date of Patent: Mar. 1, 2016

(54) ROBOT CLEANER

(71) Applicant: LG Electronics Inc., Seoul (KR)

(72) Inventors: Sunggil Park, Seoul (KR); Jaeheon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 61 days.

(21) Appl. No.: 14/019,144

(22) Filed: Sep. 5, 2013

(65) Prior Publication Data

US 2014/0257563 A1 Sep. 11, 2014

(30) Foreign Application Priority Data

Mar. 5, 2013 (KR) ........................ 10-2013-0023557

(51) Int. Cl.
G05B 19/00 (2006.01)
A47L 9/00 (2006.01)
G05D 1/02 (2006.01)

(52) U.S. Cl.
CPC .............. *A47L 9/009* (2013.01); *G05D 1/0248* (2013.01); *A47L 2201/04* (2013.01); *G05D 2201/0203* (2013.01); *Y10S 901/01* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,674,048 A * | 6/1987 | Okumura | ............... | B25J 9/1676 318/568.12 |
| 4,821,192 A * | 4/1989 | Taivalkoski | ............ | B25J 9/0003 700/258 |
| 4,893,025 A * | 1/1990 | Lee | ........................ | B25J 13/086 250/208.3 |
| 5,051,906 A * | 9/1991 | Evans, Jr. | .................. | G01S 5/16 180/169 |
| 5,440,216 A * | 8/1995 | Kim | .......................... | A47L 5/28 15/319 |
| 5,883,803 A * | 3/1999 | Vann | ..................... | G01B 11/002 356/139.03 |
| 6,389,329 B1 * | 5/2002 | Colens | ...................... | A47L 5/30 180/167 |
| 6,459,955 B1 * | 10/2002 | Bartsch | ...................... | A47L 9/00 318/568.11 |
| 7,587,260 B2 * | 9/2009 | Bruemmer | ............. | G06N 3/008 318/567 |
| 7,693,654 B1 * | 4/2010 | Dietsch | ................... | G01C 21/20 701/461 |
| 8,918,209 B2 * | 12/2014 | Rosenstein | ............ | B25J 11/009 700/245 |
| 2002/0007230 A1 * | 1/2002 | Ueno | ...................... | B25J 19/005 700/245 |
| 2002/0193908 A1 * | 12/2002 | Parker | .................... | G06N 3/008 700/258 |
| 2004/0199301 A1 * | 10/2004 | Woo | ...................... | G05D 1/0225 701/1 |
| 2004/0204792 A1 * | 10/2004 | Taylor | ................... | A47L 9/2805 700/245 |
| 2005/0132522 A1 * | 6/2005 | Im | ........................... | A47L 9/009 15/319 |
| 2005/0156562 A1 * | 7/2005 | Cohen | ..................... | A47L 9/2857 320/107 |

(Continued)

FOREIGN PATENT DOCUMENTS

DE 10-2011-053975 A1 4/2012
EP 1897476 A1 3/2008

(Continued)

*Primary Examiner* — Jonathan L Sample
(74) *Attorney, Agent, or Firm* — Dentons US LLP

(57) ABSTRACT

A robot cleaner includes a main body, a light transmitting unit, an image sensor, a base, a rotation drive unit, a tilting unit, and a tilting drive unit. The light transmitting unit emits light. The light emitted from the light transmitting unit and reflected or scattered is formed on the image sensor. The base supports the light transmitting unit and the image sensor and is rotatably disposed in the main body. The rotation drive unit rotates the base. The tilting unit tilts the light transmitting unit and the image sensor.

20 Claims, 14 Drawing Sheets

(56) References Cited

U.S. PATENT DOCUMENTS

| | | | | |
|---|---|---|---|---|
| 2005/0166354 A1* | 8/2005 | Uehigashi | A47L 9/2805 | 15/319 |
| 2005/0171644 A1* | 8/2005 | Tani | A47L 9/009 | 700/253 |
| 2005/0251292 A1* | 11/2005 | Casey | G05D 1/0238 | 700/245 |
| 2006/0025888 A1* | 2/2006 | Gutmann | G06T 7/0075 | 700/245 |
| 2006/0085105 A1* | 4/2006 | Chiu | H02J 7/0044 | 701/23 |
| 2006/0190133 A1* | 8/2006 | Konandreas | A22C 17/0013 | 700/245 |
| 2006/0190146 A1* | 8/2006 | Morse | A47L 5/14 | 701/23 |
| 2007/0016328 A1* | 1/2007 | Ziegler | A47L 5/14 | 700/245 |
| 2007/0061041 A1* | 3/2007 | Zweig | G05D 1/0261 | 700/245 |
| 2007/0192910 A1* | 8/2007 | Vu | B25J 5/007 | 700/245 |
| 2007/0213892 A1* | 9/2007 | Jones | G05D 1/0219 | 701/23 |
| 2008/0015738 A1* | 1/2008 | Casey | G05D 1/0238 | 700/258 |
| 2008/0105067 A1* | 5/2008 | Frey | G01B 11/24 | 73/865.8 |
| 2008/0161969 A1* | 7/2008 | Lee | G05D 1/0225 | 700/245 |
| 2008/0184518 A1* | 8/2008 | Taylor | A47L 9/009 | 15/319 |
| 2008/0262718 A1* | 10/2008 | Farwell | G05D 1/0246 | 701/445 |
| 2009/0218478 A1* | 9/2009 | Kim | G01S 7/495 | 250/221 |
| 2009/0281661 A1* | 11/2009 | Dooley | B60L 3/106 | 700/258 |
| 2010/0263142 A1* | 10/2010 | Jones | G05D 1/0219 | 15/21.1 |
| 2010/0312388 A1* | 12/2010 | Jang | G06Q 10/0631 | 700/248 |
| 2012/0079670 A1* | 4/2012 | Yoon | A47L 9/2815 | 15/319 |
| 2012/0089253 A1* | 4/2012 | Li | G05D 1/0225 | 700/246 |
| 2012/0182392 A1* | 7/2012 | Kearns | B25J 11/009 | 348/46 |
| 2012/0260944 A1* | 10/2012 | Martins, Jr. | A47L 5/14 | 134/18 |
| 2012/0323365 A1* | 12/2012 | Taylor | B25J 19/005 | 700/259 |
| 2013/0030750 A1* | 1/2013 | Kim | G06N 3/004 | 702/108 |
| 2013/0138246 A1* | 5/2013 | Gutmann | G05D 1/0231 | 700/253 |
| 2013/0226344 A1* | 8/2013 | Wong | G05D 1/024 | 700/258 |
| 2014/0257563 A1* | 9/2014 | Park | A47L 9/009 | 700/259 |
| 2014/0288709 A1* | 9/2014 | Sim | G05D 1/0225 | 700/259 |

FOREIGN PATENT DOCUMENTS

| | | |
|---|---|---|
| KR | 10-2002-0038296 | 5/2002 |
| KR | 10-0738888 B1 | 7/2007 |

* cited by examiner

ROBOT CLEANER

This application claims priority to Korean Patent application no. 10-2013-0023557 filed Mar. 5, 2013, which is hereby incorporated by reference.

BACKGROUND

1. Field of the Disclosure

The present disclosure relates to a robot cleaner.

2. Description of the Related Art

A robot cleaner is an apparatus that automatically cleans a target area without a user's manipulation by traveling on its own accord and suctioning foreign substances such as dust from the floor.

Generally, robot cleaners sense distances from obstacles such as furniture, office fixtures and walls within an target area to be cleaned, and avoid those obstacles by mapping the target area and controlling the driving of its left wheel and right wheel. In a related art, the traveling distance of the robot cleaner is measured by a controller using sensors to observe a ceiling or floor, and the distance from an obstacle is calculated based those observation. However, since this method adopts indirectly estimating the distance from the obstacle based on the traveling distance of the robot cleaner, when the traveling distance of the robot cleaner is not accurately measured due to unevenness of the floor, for example, a distance error from the obstacle inevitably occurs. Particularly, the distance measurement method mainly used in such robot cleaners uses infrared rays or ultrasonic waves. Thus, when the obstacle scatters much of the infrared rays or ultrasonic waves, a significant error may occur in the distance measurement.

Also, protruding obstacles such as thresholds and obstacles such as desks or beds having a certain space thereunder are three-dimensionally disposed in the area to be cleaned, but typical robot cleaners cannot recognize such obstacle situations.

SUMMARY

Thus, one object is to provide a robot cleaner which can accurately recognize the obstacle situation in an area to be cleaned.

According to an aspect of the present invention, there is provided a robot cleaner including: a main body; a light transmitting unit that emits light; an image sensor that senses light reflected or scattered by an obstacle from the light emitted from the light transmitting unit; a base supporting the light transmitting unit and the image sensor, the base rotatably disposed in the main body; a rotation drive unit that rotates the base; a tilting unit that tilts the light transmitting unit and the image sensor.

The foregoing and other objects, features, aspects and advantages will become more apparent from the following detailed description when taken in conjunction with the accompanying drawings.

BRIEF DESCRIPTION OF THE DRAWINGS

Embodiments will be described in detail with reference to the following drawings in which like reference numerals refer to like elements, and wherein.

DETAILED DESCRIPTION OF THE PREFERRED EMBODIMENTS

Figure 1:
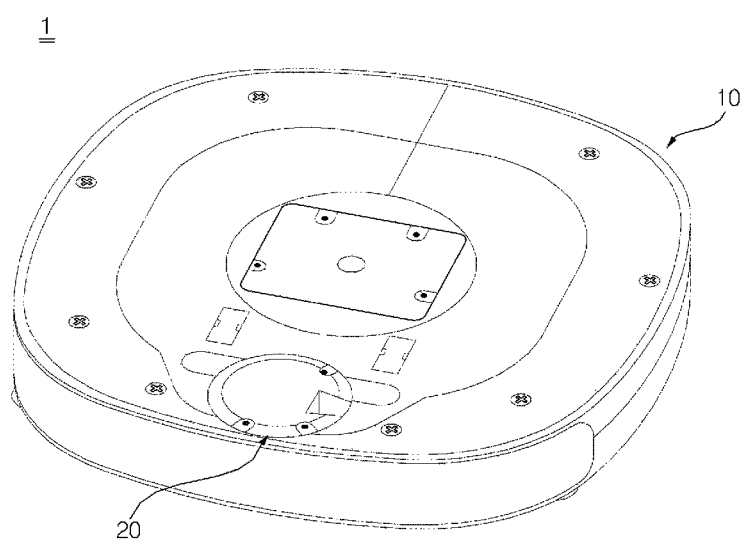
FIG. 1 is a perspective view illustrating a robot cleaner according to an embodiment of the present invention.

The foregoing and other objects, features, aspects and advantages will become more apparent from the following detailed description when taken in conjunction with the accompanying drawings. Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete to those skilled in the art. In the drawings, the shapes and dimensions may be exaggerated for clarity, and the same reference numerals will be used throughout to designate the same or like components.

Figure 2:
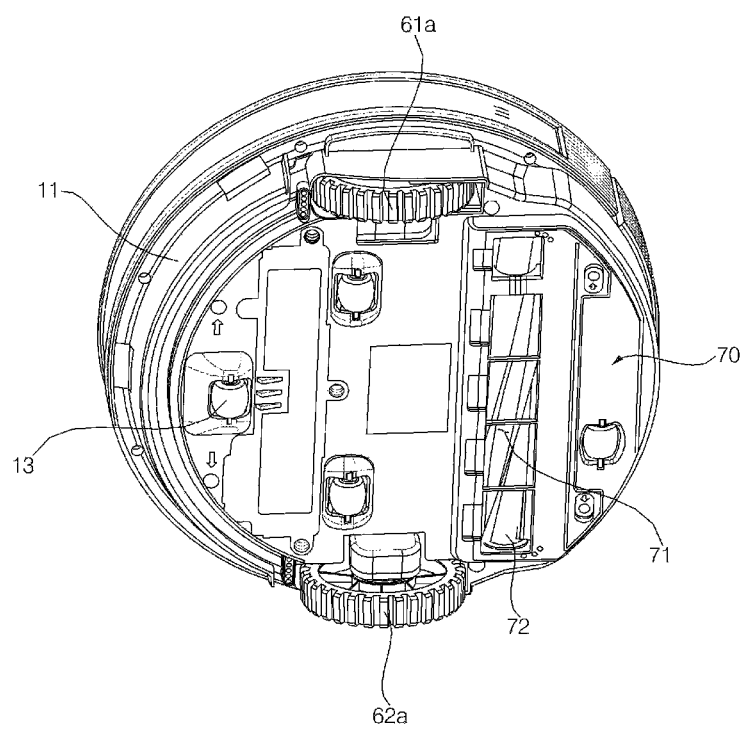
FIG. 2 is a view illustrating an undersurface of the robot cleaner of FIG. 1.
Figure 3:
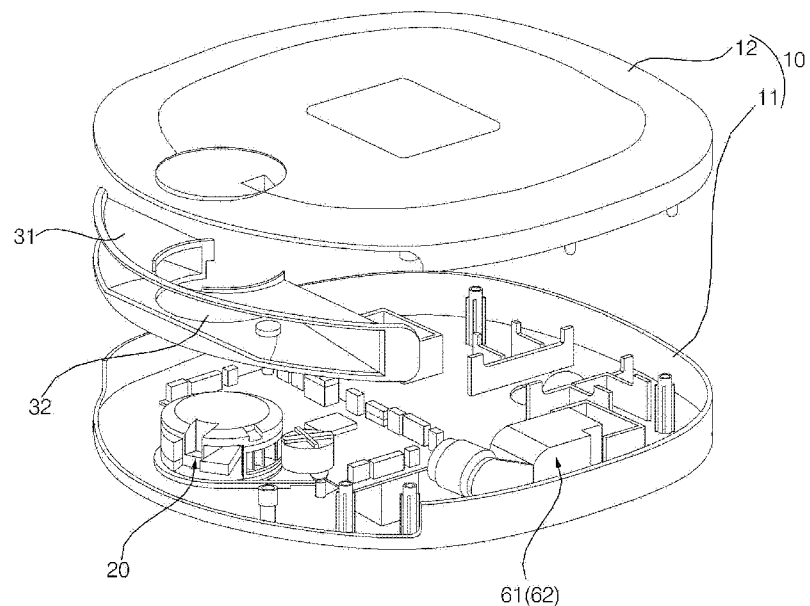
FIG. 3 is an exploded perspective view illustrating the robot cleaner of FIG. 1.
Figure 4:
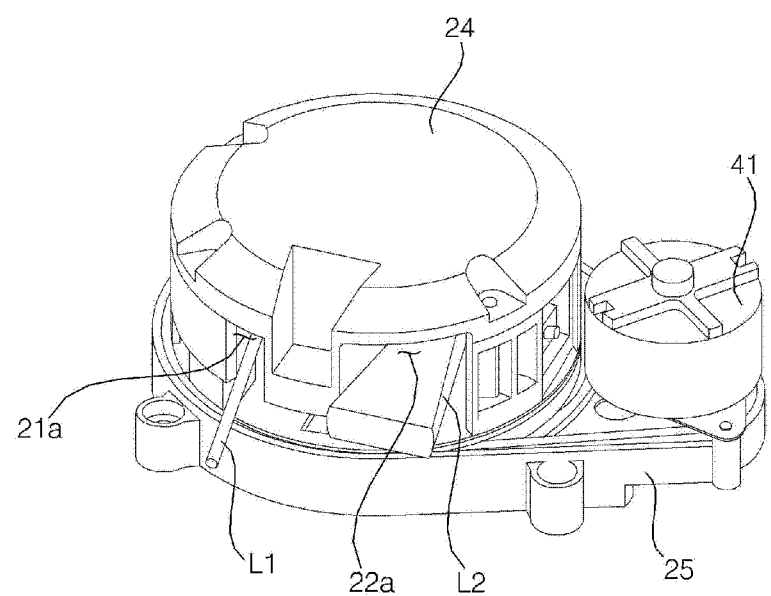
FIG. 4 is a view illustrating a location sensor of FIG. 3.
Figure 5:
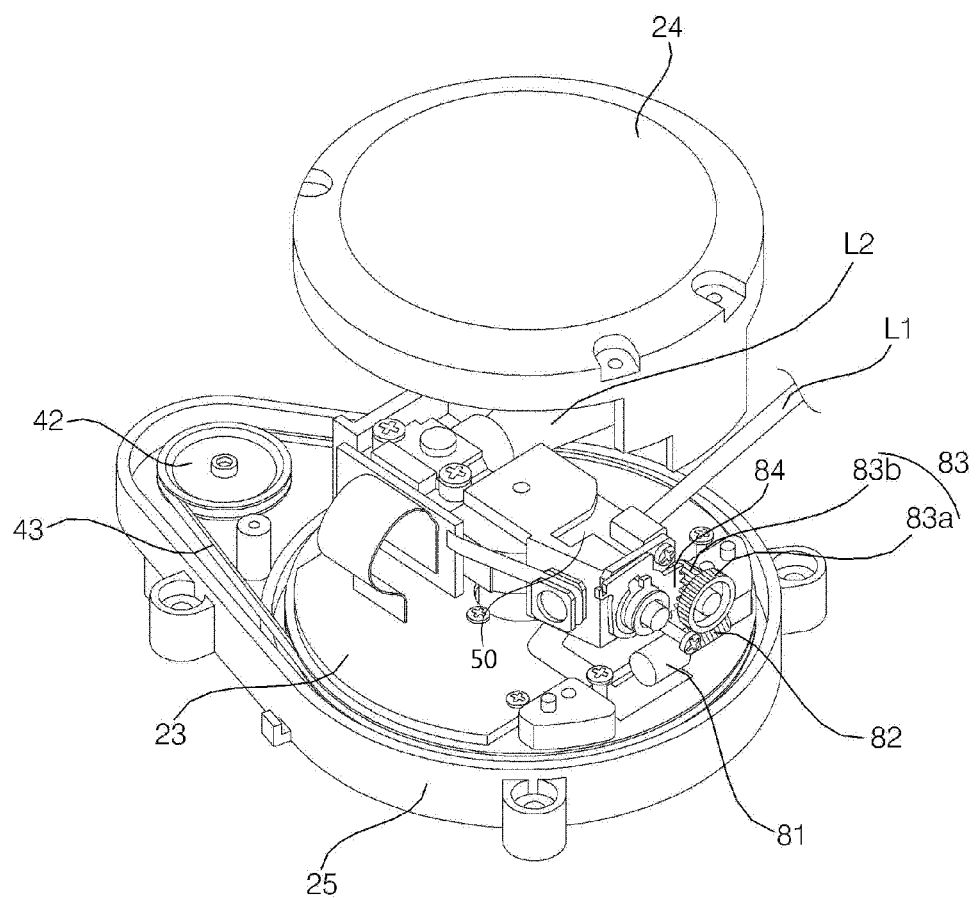
FIG. 5 is an exploded perspective view illustrating the location sensor of FIG. 4.
Figure 6:
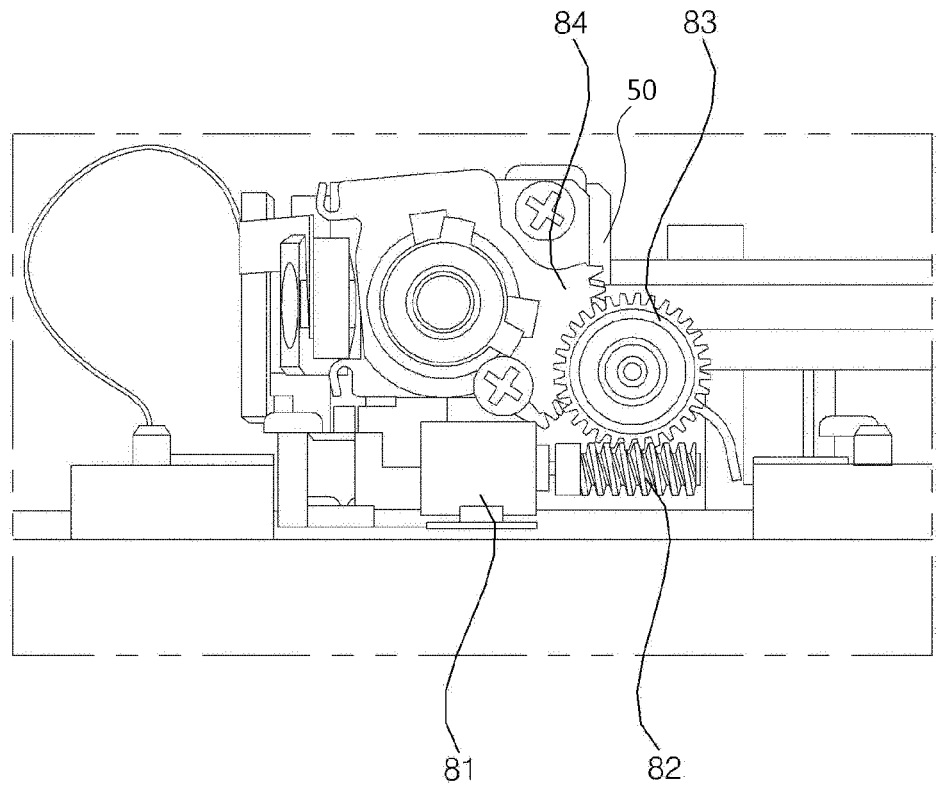
FIG. 6 is a view illustrating a tilting unit of FIG. 5.
Figure 7:
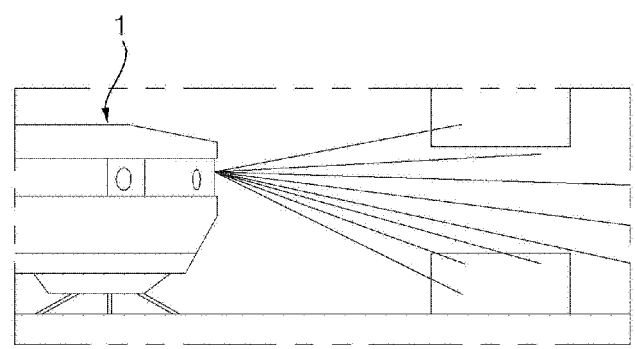
FIG. 7 is a view illustrating a light irradiation direction when a tilting unit is tilted.
Figure 8:
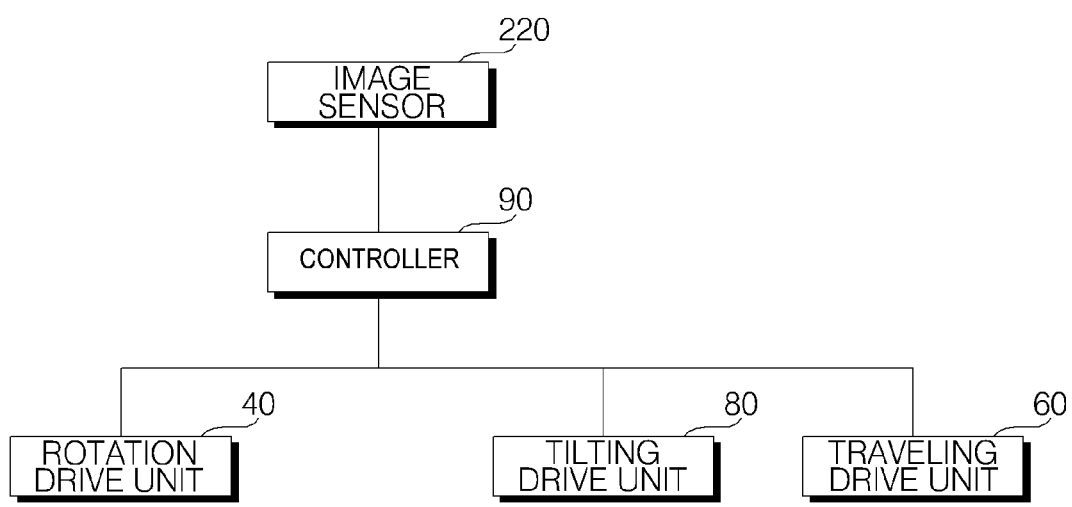
FIG. 8 is a view illustrating a control relationship among main units of a robot cleaner according to an embodiment of the present invention.

FIG. 1 is a perspective view illustrating a robot cleaner according to an embodiment of the present invention. FIG. 2 is a view illustrating an undersurface of the robot cleaner of FIG. 1. FIG. 3 is an exploded perspective view illustrating the robot cleaner of FIG. 1. FIG. 4 is a view illustrating a location sensor of FIG. 3. FIG. 5 is an exploded perspective view illustrating the location sensor of FIG. 4. FIG. 6 is a view illustrating a tilting unit of FIG. 5. FIG. 7 is a view illustrating a light irradiation direction when a tilting unit is tilted. FIG. 8 is a view illustrating a control relationship among main units of a robot cleaner according to an embodiment of the present invention.

Referring to FIGS. 1 to 8, a robot cleaner 1 according to an embodiment of the present invention may include a main body 10, a location sensor 20, a rotation drive unit 40, a tilting drive unit 80, and a controller 90.

While a left wheel 61a and a right wheel 62a of the main body 10 are rotating, the main body 10 may travel around an area (hereinafter, referred to as "cleaning area") to be cleaned to suction foreign substances such as dust or garbage through a suctioning unit 70.

The suctioning unit 70 may include a suctioning fan 72 disposed in the main body 10 to generate a suctioning force and a suctioning inlet 71 for suctioning air flow generated by the rotation of the suctioning fan 72. Also, the suctioning unit 70 may further include a filter (not shown) for filtering foreign substances among air suctioned through the suctioning inlet 71 and a foreign substance container (not shown) for collecting foreign substances filtered by the filter.

The robot cleaner 1 may further include a traveling drive unit 60 for driving the left wheel 61a and the right wheel 62a, and may further include a left wheel drive unit 61 for driving the left wheel and a right wheel drive unit 62 (reference number 62 of FIG. 3 indicates the right wheel drive unit disposed at the opposite side of the left wheel drive unit 61) for driving the right wheel 62a. Since the operation of the left wheel drive unit 61 and the right wheel drive unit 62 is independently controlled by the controller 90, the main body 10 may move forward and backward or turn around. For example, when the left wheel 61a is rotated in the forward direction by the left wheel drive unit 61 and the right wheel 62a is rotated in the backward direction by the right wheel drive unit 62, the main body may turn to right. The controller 90 may control the rotational speed of the left wheel drive unit 61 and the right wheel drive unit 62 to differ from each other. Thus, the translational motion of the main body 10 that can perform both rectilinear motion and rotational motion can be induced. The motion of the main body 10 by the control of the controller 90 enables avoidance or turning with respect to obstacles. The robot cleaner 1 may further include at least one auxiliary wheel 13 to stably support the main body 10.

The main body 10 may include a lower body 11 that houses the rotation drive unit 40, the tilting drive unit 80, and the traveling drive unit 60, and an upper body 12 that covers the lower body 11.

A transparent member 32 may be disposed on a path along which light emitted from a light-transmitting unit 21 ("21" is not shown in the figures) of the location sensor 20 or light received in a light-receiving unit 22 ("22" is not shown in the figures) travels. The transparent member 32 may be fixed on the main body 10. The main body 10 may have an opening at the front side thereof. The transparent member 32 may be fixed by a transparent member frame 31 installed in the opening.

Light emitted from the light-transmitting unit 21 may travel toward the front side of the main body through the transparent member 32, and light reflected or scattered by obstacles may travel toward the transparent member 32 to be received by the light-receiving unit 22.

The location sensor 20 may sense the location or distance of obstacles by irradiating light to the obstacles. The location sensor 20 may be rotatably and tiltably disposed in the main body 10. The location sensor 20 may further include a base 23 and a tilting unit 50 in addition to the light-transmitting unit 21 and the light-receiving unit 22 (This is not shown in the figures).

The light-transmitting unit 21 may include a light source that emits light and a collimate lens that refracts light (L1 of FIGS. 4 and 5) emitted from the light source so as to travel in parallel. The light source may include a light emitting element, e.g., an infrared or visible ray light emitting diode (LED) that emits infrared rays or visible rays. Preferably, the light source may be a light emitting element that emits a laser beam. In this embodiment, a laser diode (LD) 210 will be exemplified as the light source. Particularly, the light source using a laser beam may enable accurate measurement compared to other lights due to the monochromatic, directionality, and collimation characteristics of a laser beam. For example, compared to laser beam, infrared rays or visible rays may vary in measurement accuracy according to the ambient environmental factors such as color or texture of a subject.

The light-receiving unit 22 may include an image sensor 220 on which a spot of light (L2 of FIGS. 4 and 5) reflected or scattered by obstacles is formed.

The image sensor 220 may be an assembly of a plurality of unit pixels that are arranged in a matrix form of m×n. The unit pixel may be implemented with various kinds of light receiving elements such as cadmium sulfide cell (CdS), photo diode, photo transistor, solar cell, and photoelectric tube. These light receiving elements may convert optical signals into electric signals. One example of an image sensor may be a complementary metal-oxide semiconductor (CMOS) sensor. Also, the light receiving unit 22 may include a light receiving lens 230. Light reflected or scattered by obstacles may travel through the light receiving lens 230 to form an image on the image sensor 220. The light receiving lens 230 may include a plurality of lenses.

The base 23 may support the light transmitting unit 21 and the light receiving unit 22, and may be rotatably disposed in the main body 10. The light transmitting unit 21 and the image sensor 220 may be disposed at a certain interval on the base 23.

The tilting unit 50 may support the light transmitting unit 21 and the light receiving unit 22, and may be tiltably disposed at the base 23. The light transmitting unit 21 and the light receiving unit 22 may be disposed at a constant interval from each other on the base 23. Since the base 23 may be rotated by the rotation drive unit 40, to be described later, and the tilting unit 50 may be tilted by the tilting drive unit 80, light emitted from the light transmitting unit 21 can three-dimensionally scan obstacles within the cleaning area (see FIG. 7).

Particularly, as shown in FIG. 7, when the tilting unit 50 is downwardly tilted, light emitted from the light transmitting unit 21 may travel downwardly with respect to the horizontal direction when the tilting unit 50 is not tilted. In this case, obstacles, thresholds, and cliffs that exist at the front downward side of the robot cleaner 1 can be sensed.

Referring to FIGS. 4, 5, 6, and 8, the rotation drive unit 40, which rotates the base 23, may include a motor 41 for providing a torque and power transmission members such as belt and/or gear which deliver the torque of the motor 41 to rotate the base 23. The power transmission members are illustrated as including a pulley 42 connected to a shaft of the motor 41 and a belt 43 delivering the torque of the motor 41 between the pulley 42 and the base 23, but the present invention is not limited thereto.

Meanwhile, a supporter 25 may be further provided to support the location sensor 20. The base 23 may be rotatably supported by the supporter 25. The supporter 25 may be fixed on the lower body 11 by coupling members such as screw or bolt. In this case, the rotation drive unit 40 may rotate the base 23 with respect to the supporter 25.

A base cover 24 may be coupled to the base 23, and may rotate together with the base 23. A light transmitting passage 21a through which light emitted from the light transmitting unit 21 passes and a light receiving passage 22a through which light received in the light receiving unit 22 passes may be formed between the base cover 24 and the base 23.

The tilting drive unit 80 may tilt the tilting unit 50. The tilting drive unit 80 may include a linear or rotational motor 81. A power transmission unit may be provided to perform power transmission or conversion between the tilting drive unit 80 and the tilting unit 50. The power transmission unit may be implemented with members such as gear, pulley, and/or belt. When the rotational motor 81 is used for the tilting drive unit 80, the power transmission unit may include a worm gear 82 rotated by the motor 81, a first spur gear 83 rotatably disposed in the base 23 and engaged with the worm gear 82, and a second spur gear 84 fixedly disposed in the tilting unit 50 and engaged with the first spur gear 83. The second spur gear 84 may move together with the tilting unit 50, and may tilt the tilting unit 50 according to the rotation of the first spur gear 83. In this embodiment, the first spur gear 83 is illustrated as including a plurality of spur gears 83a and 83b having different gear teeth to adjust the gear ratio, but the present invention is not limited thereto.

The controller 90 may control the operation of the rotation drive unit 40 and the tilting drive unit 80. According to embodiments, the controller 90 may perform the control of components such as the light source 210, the image sensor 220, the traveling drive unit 60, and/or other components constituting the robot cleaner 1. For example, the controller 90 may include a microprocessor that processes electric signals inputted from the image sensor 220. The controller 90 may include only one controller. However, the robot cleaner 1 may include a plurality of controllers for controlling each component. In this case, the controller 90 may be defined as a part or all of the plurality of controllers. The controllers need only to be electrically connected to each other in terms of transmission/reception of signals. The spatial disposition between the controllers may be irrelevant to the definition of the controller 90.

Figure 9:
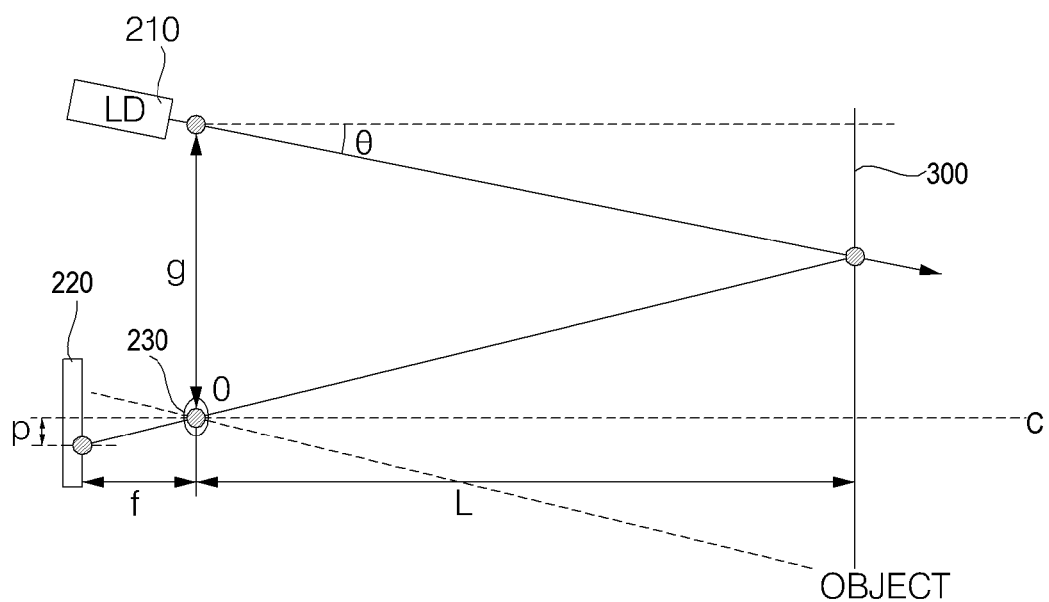
FIG. 9 is a view illustrating a principle of measuring a distance from an object.

FIG. 9 is a view illustrating a principle of measuring a distance from an object. Referring to FIG. 9, the basic principle of sensing the location of an object using the location sensor 20 may be based on a triangulation method.

Light emitted from the light source 210 may have a certain angle θ with respect to the main axis C that is orthogonal from a center surface of the light receiving lens 230. The angle θ may be closely related with the accuracy of the distance measurement from the object. If the angle θ is too small, it may be difficult to measure a distance from an object at a close range. On the other hand, if the angle θ is too large, it may be difficult to measure a distance from an object at a long range. Accordingly, the angle θ needs to have an appropriate value such that an object located at a range from about 0.1 m to about 4 m can be measured.

The image sensor 220 may be disposed such that it is spaced from the light source 210. The light receiving lens 230 may be disposed between the image sensor 220 and the object or obstacle 300. In this case, when a distance between the obstacle 300 and the light receiving lens 230 is defined as an object distance L, the object distance L can be expressed as Equation 1 below.

$$L = \frac{-fg}{p - f\tan\Theta} \quad (1)$$

Here, f is a focal length, g is an interval between the light source 210 and the light receiving lens 230, θ is an angle between light emitted from the light source 210 and the main axis C of the light receiving lens 230, and p is a length from a center O of the image sensor 220 to a spot of the image sensor 220 where light reflected or scattered by the object is detected.

Figure 10A:
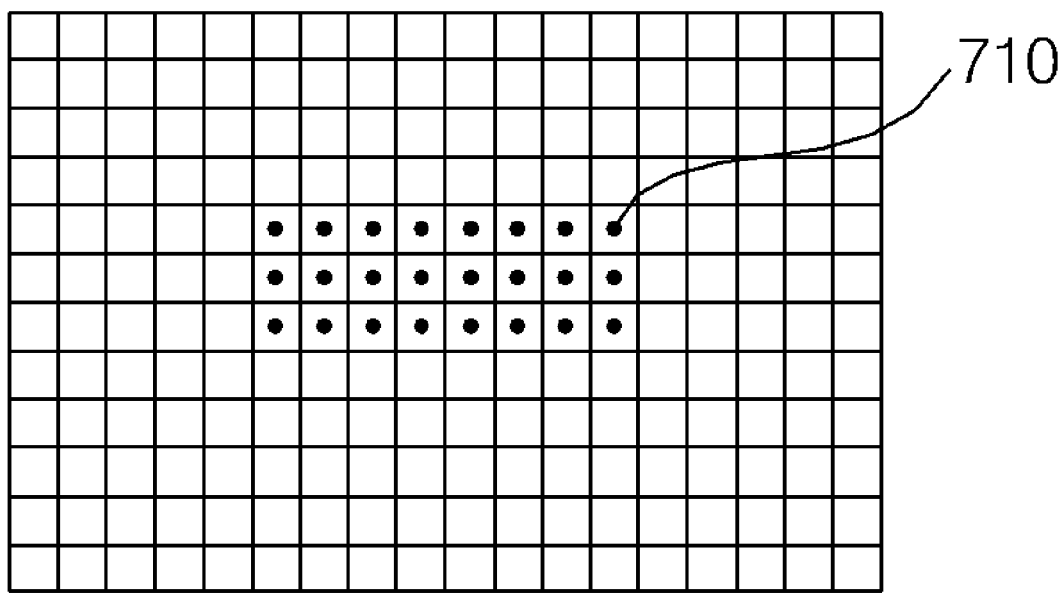
FIGS. 10A, 10B, and 10C are views illustrating three exemplary spot distributions formed on an image sensor of a location sensor.
Figure 10B:
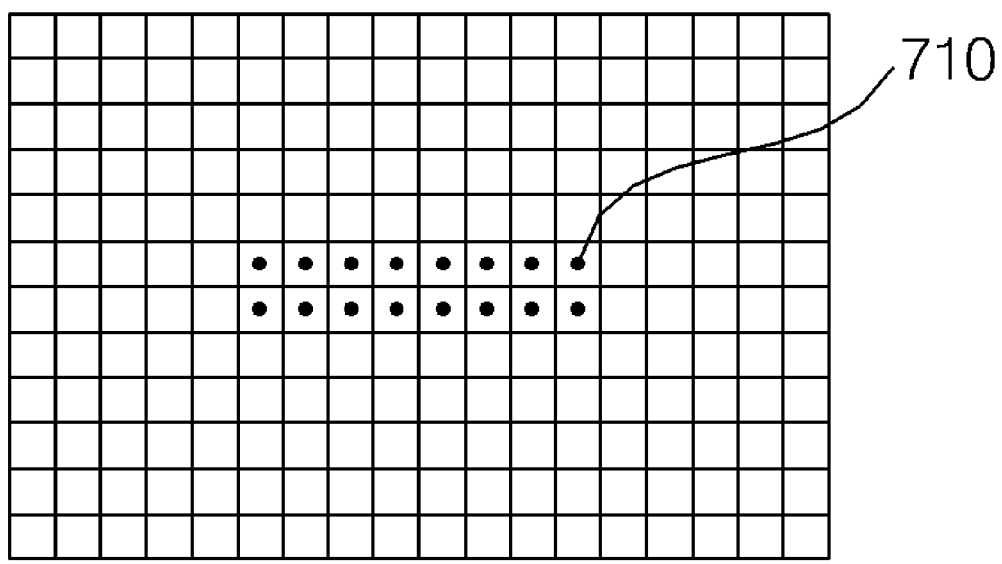
Figure 10C:
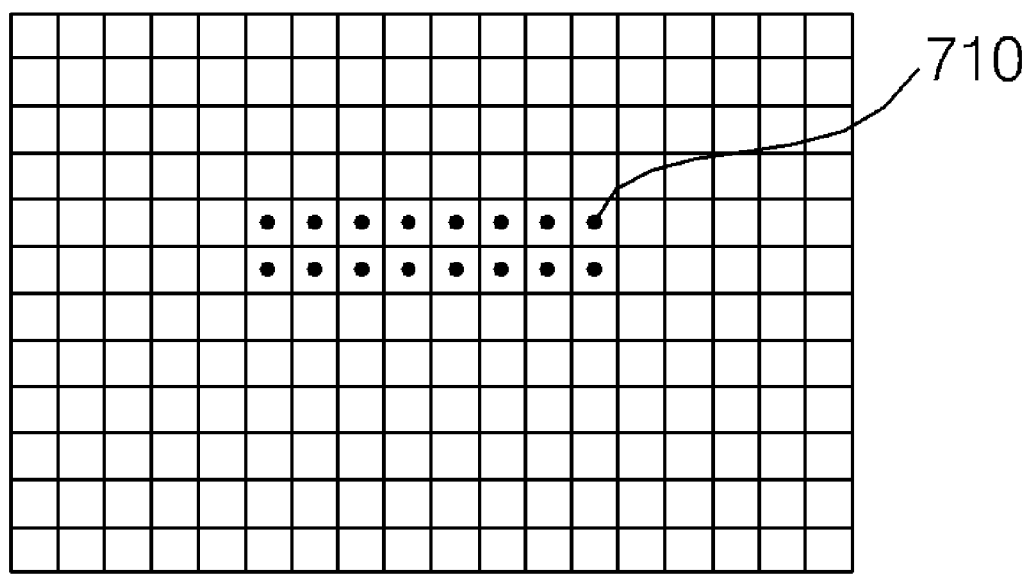
Figure 11:
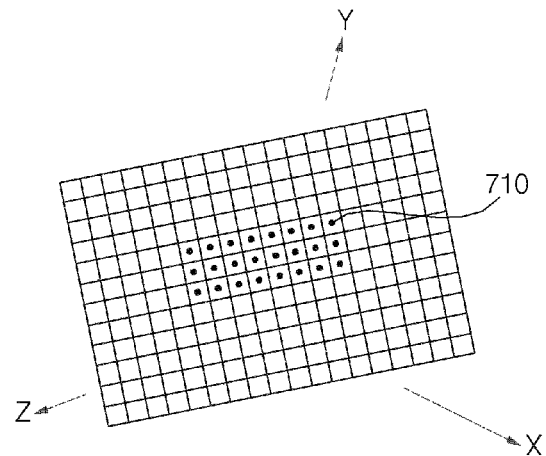
FIG. 11 is a view illustrating mapping based on location information acquired by the image sensor of FIG. 10.

FIGS. 10A, 10B, and 10C are views illustrating three exemplary spot distributions formed on an image sensor of a location sensor. FIG. 11 is a view illustrating three-dimensional mapping based on location information acquired by the image sensor of FIG. 10.

Referring to FIGS. 10A, 10B, and 10C, on a matrix of m×n indicating the location of spots formed on the image sensor 220, the column corresponds to the rotational angle ω1 of the base 23, and the row corresponds to the tilting angle ω2 of the tilting unit 50. The respective pixels of the image sensor 220 indicate the obstacle distribution situation in the cleaning area.

The location information of the respective pixels constituting the image sensor 220 may include distances from obstacles corresponding to each pixel as well as coordinates on the matrix. Accordingly, the three-dimensional location information of the obstacles corresponding to the respective pixels can be acquired by the location information of the respective pixels.

While the base 23 rotates by one cycle, the spots formed on the image sensor 220 may be indicated in the same row. Accordingly, each column of the spot coordinates in the matrix may correspond to the rotational angle ω1 of the base 23.

The rotation of the base 23 may be considered as turning within a certain range, or may be considered as 360 degrees or more rotation. For example, the rotation drive unit 40 may continuously rotate the base 23 in one direction. In this case, since spots are formed on the image sensor 220 only when light emitted from the light transmitting unit 21 is reflected and passes through the transparent member 32 to be received by the image sensor 220, the location information used for the mapping of the cleaning area may be obtained from a section corresponding to the profile of the transparent member 32, for example, section between 0 degree to 180 degrees.

Also, tilting unit 50 may be tilted according to the operation of the tilting drive unit 80. In this case, the rotational angle can be defined as a tilting angle ω2. Each row of the spot coordinates on the matrix may correspond to the tilting angle ω2 of the tilting unit 50.

In this regard, spots are distributed over three rows in FIG. 10A. The spots in each row may be spots formed on the image sensor 220 at three different tilting angles at which the tilting unit 50 is tilted by the operation of the tilting drive unit 80. For example, FIG. 10A shows the arrangement of the spots when obstacles exist at the upper and lower part within the cleaning area.

Similarly, FIGS. 10B and 10C show a scan result of the cleaning area when the tilting unit 50 is tilted by the operation of the tilting drive unit 80 and is rotated by the rotation drive unit 40. FIG. 10B shows a situation where obstacles are mainly distributed at the lower part in the cleaning area compared to FIG. 10A, and FIG. 10C shows a situation where obstacles are mainly distributed at the upper part in the cleaning area compared to FIG. 10A.

In other words, the location sensor 20 according to an embodiment of the present invention can scan the cleaning area while tilting and rotating with respect to the main body 10. In this case, the coordinates of the spots formed on the image sensor 220 may correspond to the tilting angle ω2 of the tilting unit 50 in row, and may correspond to the rotational angle ω1 of the base 23 in column. Accordingly, the controller 90 can three-dimensionally map the obstacle distribution situation in the cleaning area from the coordinates of the spots and the distances from the obstacles corresponding to each spot in accordance with Equation (1) described above. Hereinafter, the rotational angle ω1, the tilting angle ω2, and the object distance L corresponding to each spot will be referred to as location information.

Referring to FIG. 11, the controller 90 can map the obstacle distribution situation in the cleaning area, based on the location information. FIG. 11 shows mapping of the coordinate [ω1, ω2, L] of each pixel on X-Y-Z space, and three-dimensionally shows the obstacle situation in the cleaning area. As shown in FIG. 11, since the location on Z-axis is assigned according to the object distance L corresponding to each pixel, it can be shown that X-Y plane where pixels are located is distorted in the Z-axis direction.

The tilting unit 50 may be upwardly or downwardly tilted according to the operation of the tilting drive unit 80. Hereinafter, the location of the tilting unit 50 where light is emitted from the light transmitting unit 21 in a certain direction is defined as a first location, and the location where the tilting unit 50 is tilted from the first location according to the operation of the tilting drive unit 80 is defined as a second location. Here, it should be noted that the second location is not necessarily limited to a certain location. The second location needs only to be a location tilted from the first location. Also, the tilting direction may be an upward or downward direction, and the tilting angle may also have a certain value.

That is, the first location and the second location may be relative to each other. The operation of the tilting drive unit 80 may be controlled such that location of the tilting unit 50 can be subdivided between the location where light emitted from the light transmitting unit 21 travels utmost downwards and the location where light travels utmost upwards, enabling the detection of obstacles at each tilting angle between the utmost downward and the utmost upward.

As described above, FIGS. 10A, 10B, 10C, and 11 show the distribution of the spots when ranges covering three or more rows are scanned. This means that the obstacles are sensed at three or more locations where tilting angle of the tilting unit 50 are different from each other.

As described above, the main body 10 may have an opening at the front side thereof to allowing light emitted from the light source 210 to pass through. According to embodiments, the opening may be provided with a transparent member 32 that passes light.

The controller 90 may perform at least one of a first obstacle sensing control of rotating the base 23 by controlling the rotation drive unit 40 when the tilting unit 50 is at the first location and a second obstacle sensing control of rotating the base 23 by controlling the rotation drive unit 40 after tilting the tilting unit 50 to the second location by controlling the tilting drive unit 80. The first obstacle sensing control may be to sense the location of obstacles distributed at a relatively lower location in the cleaning area, and the second obstacle sensing control may be to sense the location of obstacles distributed at a relatively higher location than the first obstacle sensing control. Regarding the same obstacle, the location information acquired by the first obstacle sensing control and the location information acquired by the second obstacle sensing control may include information regarding the same obstacle on the plane. In this case, however, according to the height of an obstacle to be sensed, the location information acquired by the second obstacle sensing control may indicate that the obstacle exists at a certain location on the plane while the location information acquired by the first obstacle sensing control indicates that the obstacle does not exist at the same location on the plane. Such may be a case where a certain space (not sensed at the first location) exists under a bed frame (obstacle sensed at the second location) supporting a bed, for instance.

The controller 90 may control the traveling driving unit 60 based on the obstacle situation in the cleaning area, i.e., ambient obstacle situation acquired by the mapping or the location information acquired by the image sensor 220.

Figure 12:
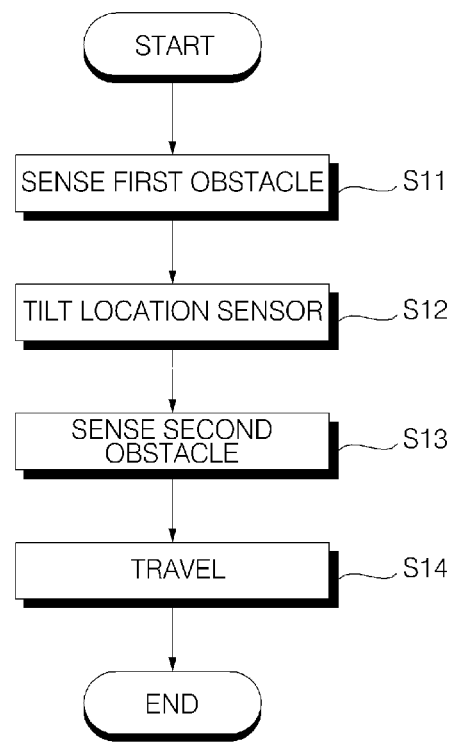
FIG. 12 is a flowchart illustrating a method of controlling a robot cleaner according to an embodiment of the present invention.

FIG. 12 is a flowchart illustrating a method of controlling a robot cleaner according to an embodiment of the present invention. Referring to FIG. 12, the controller 90 may sense the location of obstacles by controlling the rotation drive unit 40 such that the base 23 is rotated while the tilting unit 50 is at the first location (first obstacle sensing; S11). If an obstacle is sensed upon first obstacle sensing, the controller 90 may control the tilting drive unit such that the tilting unit 50 is tilted to the second location (rising of location sensor; S12), and may re-sense the location of the obstacle by controlling the rotation drive unit 40 such that the base 23 is rotated at the second location (second obstacle sensing; S13). Thereafter, the controller 90 may map the obstacle situation in the cleaning area based on the obstacle sensing results at the first and second locations, and may perform traveling of the robot cleaner 1 based on the mapping result (traveling; S14).

The traveling in operation S14, as described with reference to FIGS. 10A, 10B, and 10C, may include avoidance traveling, cross traveling, and passing traveling according to the obstacle situation.

Figure 13:
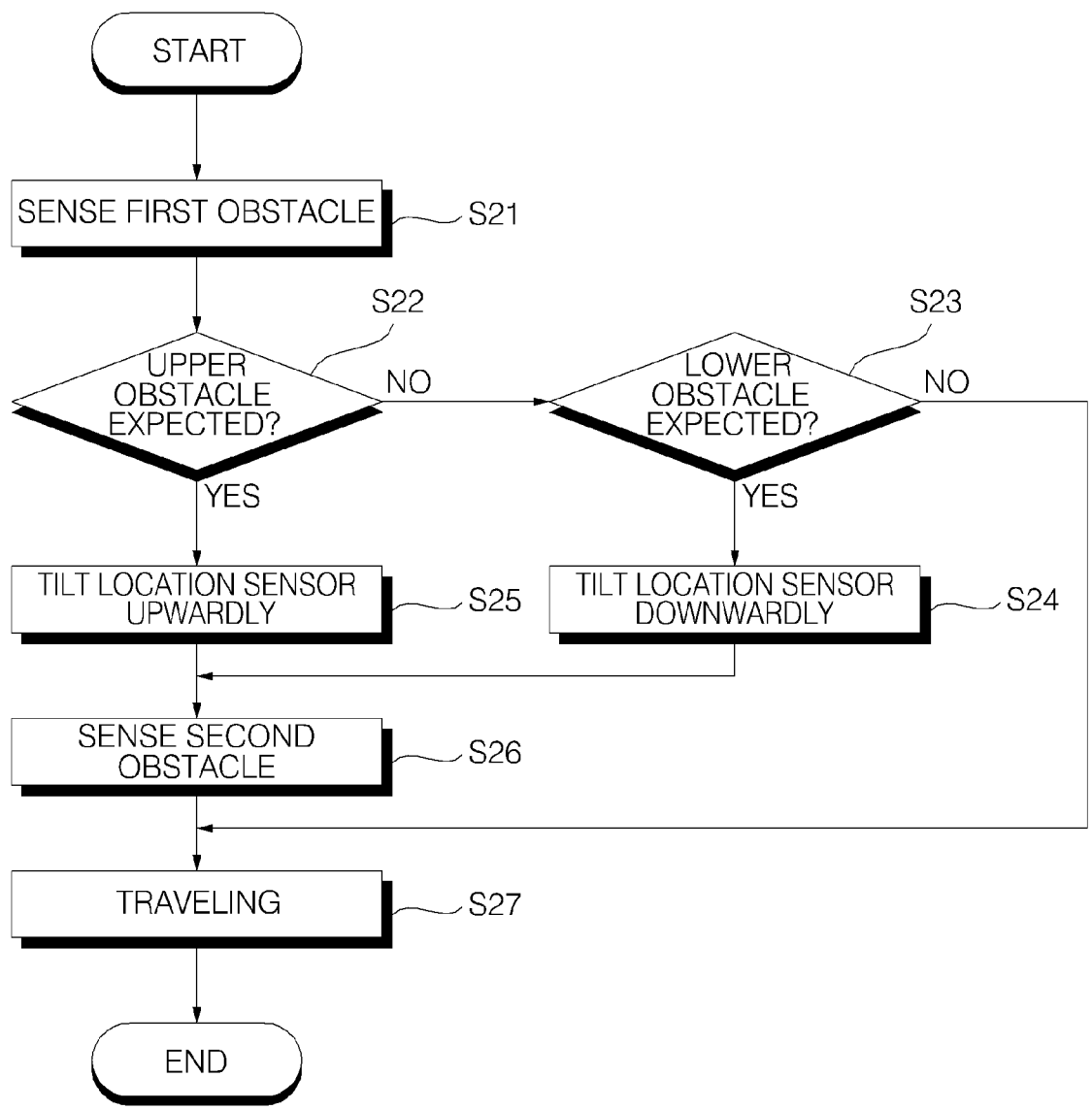
FIG. 13 is a flowchart illustrating a method of controlling a robot cleaner according to another embodiment of the present invention.
Figure 14A:
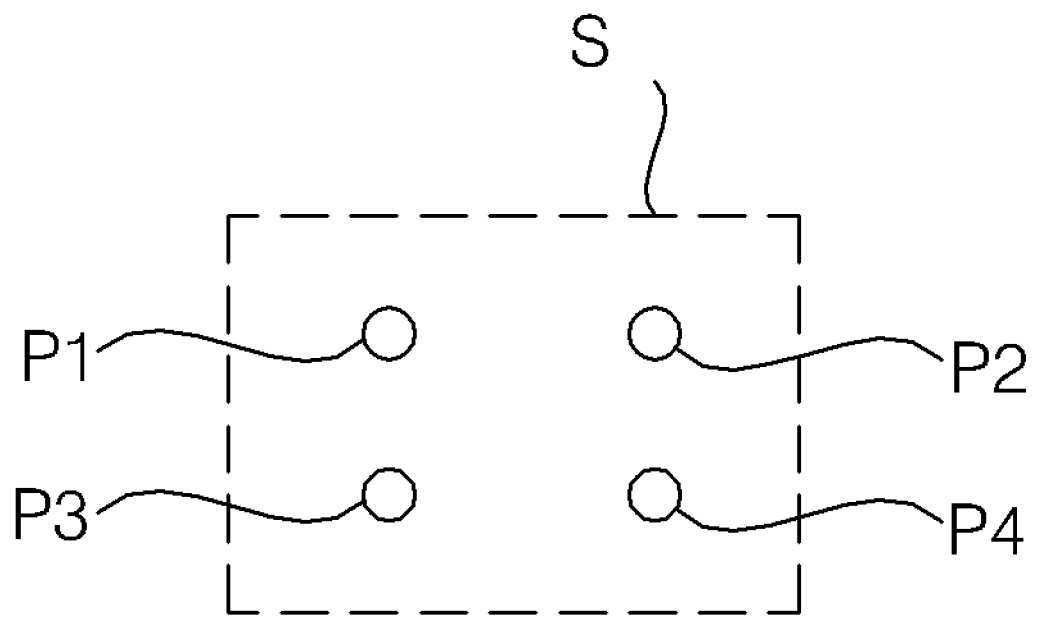
FIGS. 14A, 14B, and 14C are views illustrating three exemplary obstacle situations sensed within a cleaning area.
Figure 14B:
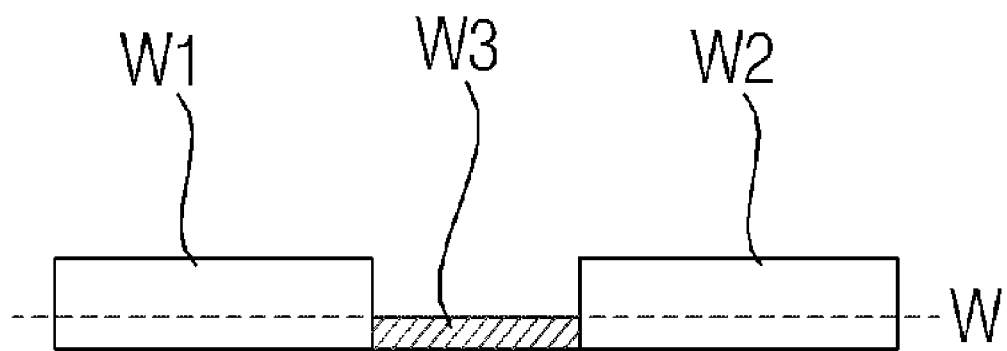
Figure 14C:
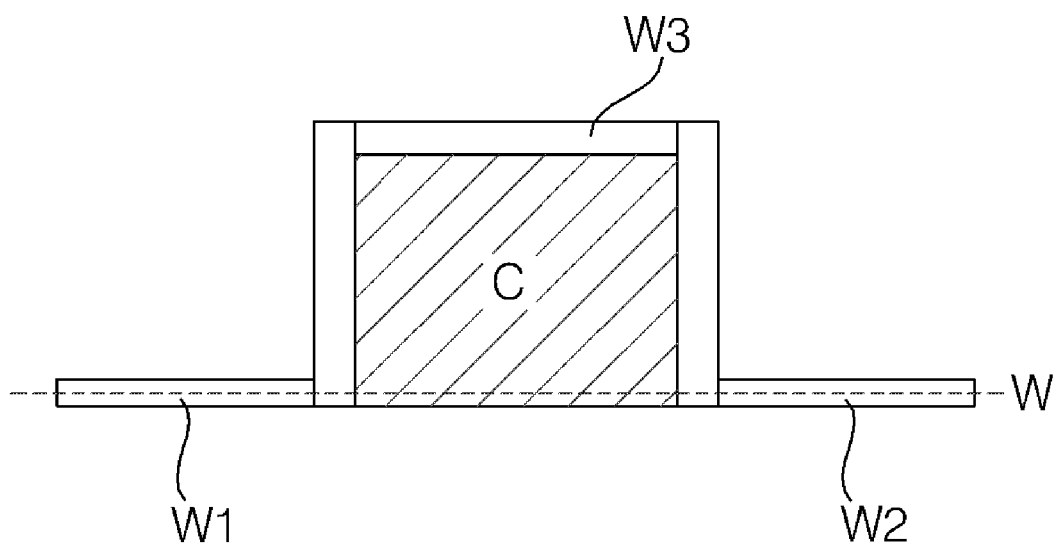

FIG. 13 is a flowchart illustrating a method of controlling a robot cleaner according to another embodiment of the present invention. FIGS. 14A, 14B, and 14C are views illustrating three exemplary obstacle situations sensed within a cleaning area. Referring to FIGS. 13, 14A, 14B, and 14C, the controller 90 may sense the location of obstacles by controlling the rotation drive unit 40 such that the base 23 is rotated while the tilting unit 50 is at the first location (first obstacle sensing; S21)

Three situations of FIGS. 14A, 14B, and 14C can be assumed as examples in which an obstacle exists within a range sensed by the first obstacle sensing.

FIG. 14A shows a case where four or more obstacles P1, P2, P3 and P4 are sensed to be distributed in a certain range S through an ambient obstacle situation mapped by the first obstacle sensing. This may mainly occurs in a case where furniture such as desk, chair, table, and bed supported by four or more legs exist within the cleaning area. This sensing result may correspond to a case where an upper obstacle (e.g., bed frame supporting the mattress) is expected to exist ('Yes' of S22). The controller 90 may control the tilting drive unit 80 such that the tilting unit 50 is tilted to the second location (tilting location sensor upwards; S25), and then may control the rotation drive unit 40 such that the base 23 is rotated at the second location to re-sense the location of the obstacle (second obstacle sensing; S26).

Thereafter, the controller 90 may map the obstacle situation in the cleaning area based on the obstacle sensing results at the first and second locations and may perform traveling of the robot cleaner 1 based on the mapping result (traveling; S27). As described with reference to FIGS. 10A, 10B, and 10C, the traveling in operation S27 may include avoidance traveling, cross traveling, and passing traveling according to the obstacle situation.

In FIG. 14B, (FIG. 14B does not correspond to this passage) based on the ambient obstacle situation mapped by the first obstacle sensing (S21) and the second obstacle sensing (S26), when two straight line components W1 and W2 that are spaced from each other at a certain interval on the same line W are detected, the traveling drive unit 60 may be controlled according to the height of a section W3 between the two straight line components W1 and W2. FIG. 14B corresponds to a case where a door between walls is opened. The two straight line components W1 and W2 correspond to the walls, and the section W3 between the two straight line components W1 and W2 corresponds to a threshold. In this case, the controller 90 may control the traveling drive unit 60 according to the height of the threshold. That is, when there is no threshold or the height of the threshold is low enough to cross the threshold, the controller 90 may control the traveling drive unit 60 so as to perform the cross traveling, and otherwise, the controller 90 may control the traveling drive unit 60 so as to perform the avoidance traveling.

In FIG. 14C, based on the ambient obstacle situation mapped by the first obstacle sensing (S21) and the second obstacle sensing (S26), two straight line components W1 and W2 that are spaced from each other at a certain interval on the same line W are detected, and a straight line component W3 away from the two straight line components W1 and W2 is detected. This may corresponds to a front door in which a certain recessed area C among walls exists. Generally, the recessed area C such as the front door where shoes are placed may have a bottom lower than the floor of the living room. Accordingly, the controller 90 may control the traveling drive unit 60 so as to perform the avoidance traveling for the recessed area C.

However, the robot cleaner 1 may perform the passing (or crossing) traveling according to the depth of the recessed area C. As shown in FIG. 14C, when a lower obstacle (e.g., recessed obstacle such as front door) is expected to exist ('Yes' of S23), the controller 90 may control the tilting drive unit 80 such that the tilting unit 50 is tilted downwards (S24), and may control the rotation drive unit 40 such that the base 23 is rotated again to perform the obstacle sensing for the cleaning area. Since the obstacle sensing is performed while the tilting unit 50 is tilted downwards, the depth of the recessed area C can be measured.

In this case, however, in order to accurately measure the depth of the recessed area C, light emitted from the light transmitting unit 21 needs to reach the bottom of the recessed area C. Accordingly, the controller 90 may control the traveling drive unit 60 such that the main body 10 approaches the straight line components W1, W2 or the collinear line W by a certain distance, and then may perform control of the second obstacle sensing (S24, S26). Thereafter, the controller 90 may determine whether to pass or avoid the recessed area C based on the result measured by the control of the second obstacle sensing.

The robot cleaner according to the embodiments of the present invention has an effect of accurately scanning the obstacle situation in the cleaning area. Particularly, the obstacle distribution situation in the cleaning area can be three-dimensionally scanned, and based thereon, appropriate avoidance or cross traveling for obstacles can be performed.

Also, the robot cleaner according to the embodiments of the present invention has an effect of accurately scanning the obstacle distribution situation in the cleaning area, as well as the distance from the obstacles.

A method of controlling a robot cleaner according to embodiments of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves such as data transmission through the Internet. The computer readable recording medium can also be distributed over network coupled computer systems so that the computer readable code is stored and executed in a distributed fashion.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot cleaner comprising:
   a main body;
   a suctioning unit that suctions foreign substances on a cleaning area, the suctioning unit disposed in the main body;
   a light transmitting unit that emits light;
   an image sensor that senses light reflected or scattered by an obstacle from the light emitted from the light transmitting unit;
   a base supporting the light transmitting unit and the image sensor, the base disposed in the main body, the base being rotatable with respect to the main body;
   a rotation drive unit that rotates the base;
   a tilting unit that tilts the light transmitting unit and the image sensor; and
   a controller that obtains a location of the obstacle from a rotational angle of the base rotated by the rotation drive unit, a tilted angle of the light transmitting unit and the image sensor tilted by the tilting unit, and a location of a spot formed on the image sensor.

2. The robot cleaner of claim 1, wherein the controller controls an operation of at least one of the rotation drive unit and the tilting unit.

3. The robot cleaner of claim 2, wherein the tilting unit tilts the light transmitting unit and the image sensor downwardly or upwardly with respect to a horizontal plane based on the control of the controller.

4. The robot cleaner of claim 3, wherein the light emitted from the light transmitting unit travels downwardly or upwardly corresponding to a tilted angle of the light transmitting unit tilted by the tilting unit.

5. The robot cleaner of claim 4, wherein the controller performs at least one of a first obstacle sensing control by controlling the tilting drive unit to tilt to a first location such that the light emitted from the light transmitting unit to the obstacle occurs at the first location of the tilting unit and a second obstacle sensing control by controlling the tilting unit to tilt to a second location from the first location such that the light emitted from the light transmitting unit to the obstacle occurs at the second location of the tilting unit.

6. The robot cleaner of claim 5, wherein the controller performs the rotation of the base by controlling the rotation drive unit after performing the first obstacle sensing control or the second obstacle sensing control.

7. The robot cleaner of claim 6, wherein the base is turned within a certain angle range, 360 degrees, or more than 360 degrees.

8. The robot cleaner of claim 5, wherein the first obstacle sensing control performed by the controller senses the obstacle at a lower location of an area and the second obstacle sensing control performed by the controller senses the obstacle at a higher location of the area that is higher than the lower location of the first obstacle control.

9. The robot cleaner of claim 6, wherein the controller three-dimensionally maps the obstacle in an area using the rotational angle, the tilted angle, and a distance from the obstacle obtained from the location of the spot formed on the image sensor.

10. The robot cleaner of claim 8, wherein the controller performs the second obstacle sensing control when a plurality of obstacles are sensed within the area sensed by the controller through the first obstacle sensing control.

11. The robot cleaner of claim 10, wherein the controller performs the second obstacle sensing control when two straight line components spaced from each other at a certain interval on the same line are sensed by the controller through the first obstacle sensing control.

12. The robot cleaner of claim 11, wherein the controller controls the traveling drive unit such that the robot cleaner approaches the straight line components or a collinear line by a certain distance, and then performs the second obstacle sensing control.

13. The robot cleaner of claim 10, wherein when two straight line components spaced from each other at a certain interval on the same line are sensed by the controller through the first obstacle sensing control, the controller controls the traveling drive unit so as to travel avoiding between the two straight line components.

14. The robot cleaner of claim 1, wherein the light transmitting unit comprises a laser diode that emits a laser beam.

15. The robot cleaner of claim 1, wherein the main body has an opening formed in the front surface thereof, and the light emitted from the light transmitting unit passes through the opening.

16. The robot cleaner of claim 15, wherein the opening of the main body passes light reflected or scattered by the obstacle from light emitted from the light transmitting unit to the image sensor.

17. The robot cleaner of claim 16, further comprising a transparent member provided in the opening of the main body to pass the light emitted from the light transmitting unit or the light reflected or scattered by the obstacle.

18. A robot cleaner comprising:
a main body;
a suctioning unit that suctions foreign substances on a cleaning area, the suctioning unit disposed in the main body;
a light transmitting unit that emits laser beam;
an image sensor that senses light reflected or scattered by an obstacle from the laser beam emitted from the light transmitting unit;
a base supporting the light transmitting unit and the image sensor, the base being rotatable with respect to the main body;
a rotation drive unit that rotates the base, the rotation drive continuously rotating the base more than 360 degree while the light transmitting unit emits the laser beam; and
a tilting unit that tilts the light transmitting unit and the image sensor about the base.

19. The robot cleaner of claim 18, wherein the main body has an opening formed in the front surface thereof, and the light emitted from the light transmitting unit passes through the opening,
wherein the opening of the main body passes light reflected or scattered by the obstacle from light emitted from the light transmitting unit to the image sensor.

20. The robot cleaner of claim 19, further comprising a transparent member provided in the opening of the main body to pass the light emitted from the light transmitting unit or the light reflected or scattered by the obstacle.

* * * * *